United States Patent Office.

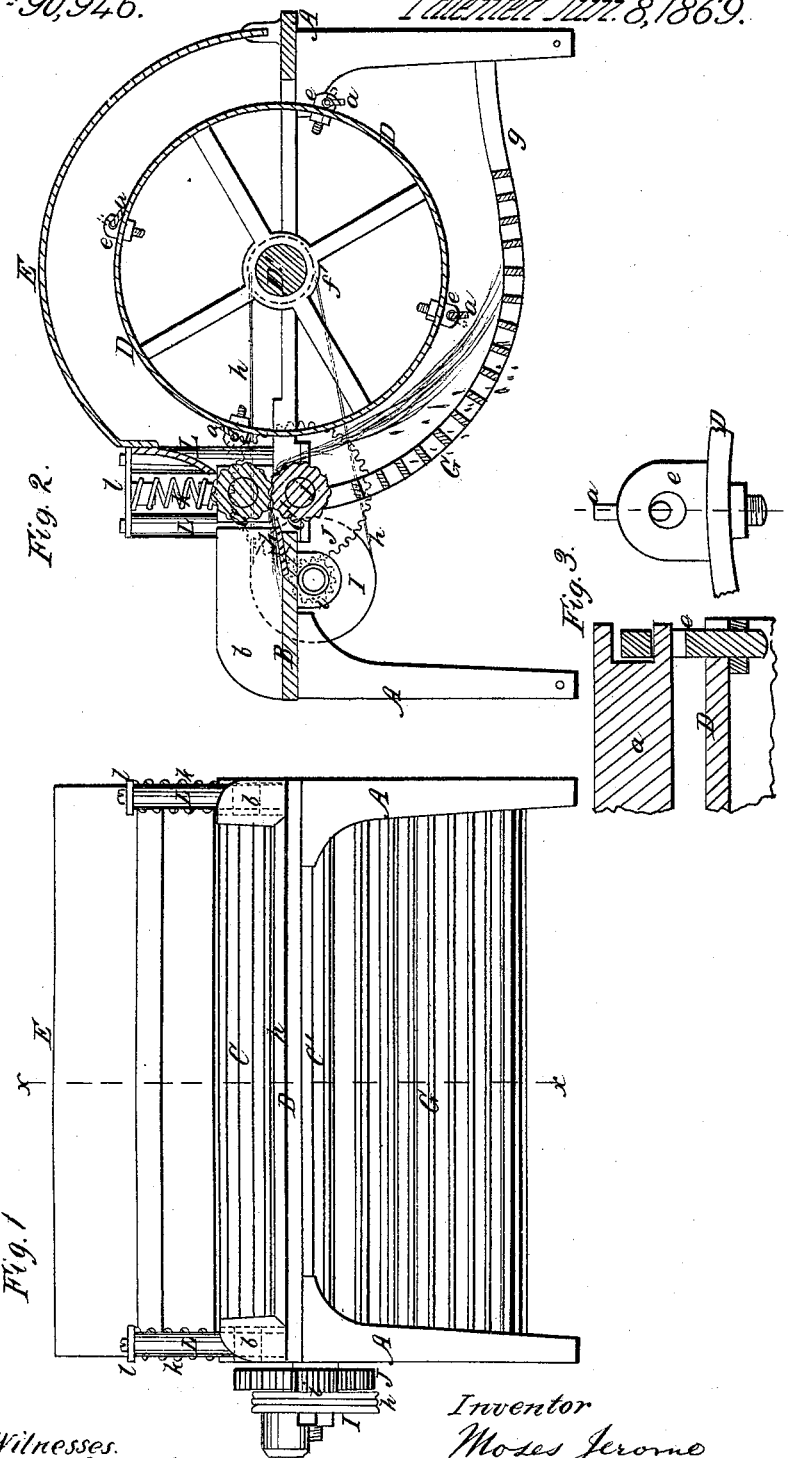

MOSES JEROME, OF DIXON, ILLINOIS.

*Letters Patent No. 90,946, dated June 8, 1869.*

---

IMPROVEMENT IN MACHINE FOR SCUTCHING AND THRESHING FLAX.

---

The Schedule referred to in these Letters Patent and making part of the same.

---

*To all whom it may concern:*

Be it known that I, MOSES JEROME, of the city of Dixon, in the county of Lee, and State of Illinois, have invented a new and improved Machine for Scutching and Threshing Flax; and I do hereby declare that the following is a full, clear, and exact description thereof, reference being had to the accompanying drawings, making part of this specification, in which—

Figure 1 is an elevation of the front part of the improved machine.

Figure 2 is a section, taken longitudinally through the machine in the vertical plane indicated by red line $x\ x$ in fig. 1.

Figures 3 are views in detail, showing a mode of pivoting the swingles, or beating-blades to their cylinder.

Similar letters of reference indicate corresponding parts in the several figures.

This invention relates to certain new and useful improvements of machinery which is designed for threshing the seed from flax, and also for removing the shive, or woody matter from the fibre, after the threshed straw has been passed through the brake.

The nature of my invention consists—

First, in a cylinder, having a number of beating-blades arranged around it, at suitable distances apart, and pivoted to it in such manner, that when the cylinder is rotated at the proper degree of speed, these beaters will be thrown out by centrifugal force, and strike the flax with yielding blows, in combination with feed-rollers, which will operate to feed into the machine the flax, as well as to hold it while being acted upon by said blades, or beaters, as will be hereinafter explained.

Secondly, in combining with said yielding beating-blades a concave grating, which is arranged in such manner as to prevent the passage of the flax through it, and, at the same time, allow the seed or shives to be separated from the flax while passing through the machine, as will be hereinafter explained.

To enable others skilled in the art to understand my invention, I will describe its construction and operation.

In the accompanying drawings—

A represents the frame, or table of the machine.

B represents the feed-board, over which the flax is passed on its way to the feed-rollers C C'.

These two rollers are corrugated, or fluted, as shown, in order that they shall firmly bite and hold the flax while feeding it to the threshing, or scutching-drum D.

The roller C' has fixed bearings, and receives its rotation, at a comparatively slow speed to the drum D, from a pulley, $f$, on drum-shaft D', acting through the medium of belt $h$, pulley I, pinion $i$, and a spur-wheel, J, which latter is keyed on the shaft $j$ of said feed-roller C'.

The upper roller C is held down with more or less yielding pressure by means of springs $k\ k$, interposed between the journal-boxes of the shaft of this roller and cross-heads $l\ l$, on standards L L, which rise from the sides of frame A.

$b\ b$ are side-boards to the feed-board B, and $p$ is an extension of B, for conducting the flax between the bite of the said feed-rollers C C'.

For a cylinder, D, say about two feet diameter, and feed-rollers, each three inches diameter, the relative speeds of the cylinder and rollers may be about ten to one, the cylinder rotating ten times while the feed-rollers make one revolution.

The shaft D' of cylinder D has its bearings in suitable journal-boxes, secured on top of the frame, and this shaft is parallel to the feed-rollers, as shown in the drawings.

A hood, or casing, E, covers the upper half of cylinder D, and is mounted upon frame A, and a concave grating, G, extends beneath this cylinder, starting from the lower feed-roller C', and terminating at a suitable point for discharging the dressed flax beneath the cylinder.

This grating is composed of cross-bars, arranged parallel to each other, with their upper edges presented to the cylinder, and secured at suitable distances apart to side-bars, which are supported by the frame A.

At suitable distances apart, around the axis of the cylinder D, I apply the swingles, or beating-blades $a\ a\ a\ a$, the ends of which are pivoted to eye-bolts $e$, in the manner shown in figs. 3, or in any other suitable manner which will allow these blades to swing freely about their pivots, and assume the positions indicated in red lines, fig. 2, when cylinder D is caused to rotate rapidly. If the cylinder is a very long one, or even for a short cylinder of three feet, the blades may be supported by pivotal connections, at intermediate points between their ends, or the blades may be made up of short sections, pivoted at the ends and middle of the cylinder in any suitable manner.

It will be seen from the above description that the machine is adapted both for threshing and separating seed from flax without breaking the straw, and for separating the shive, or woody matter from the fibrous stock, without injury to the latter. The feed-rollers will hold the material firmly between them, and slowly feed it up to the cylinder D, where it will be repeatedly and rapidly struck by the yielding blades $a$, and the seed or shive, as the case may be, separated from the fibres, and driven through grating G, while the fibres will be carried along and discharged at the tail of this grating.

This machine is especially adapted for scutching tangled flax, for making tow, but it is also useful for scutching "live" flax or hemp, by a suitable adjustment of the feed-rollers, for releasing the stock after it is fed into the machine the proper distance.

If desirable, shifting-gears, or belt-wheels, or other equivalent means may be adopted for regulating the speed of the feed-rollers, according to the quality of the work to be done, for the slower the feed, the better the flax will be threshed, or scutched.

I am aware, that broadly considered, loose wings, blades, or beaters have been used before my invention, and, therefore, I do not claim them irrespective of the combination which I have above described.

What I do claim as new, and desire to secure by Letters Patent, is—

1. The combination of feed-rollers for holding the material while being treated, and slowly feeding it to its work, with yielding wings, or beating-blades, substantially as described.

2. A grating, or separator, G, or its equivalent, with yielding wings, or beaters, substantially as described.

MOSES JEROME.

Witnesses:
H. D. DEMENT,
A. W. JEROME.